US008737282B2

(12) United States Patent
Tseng et al.

(10) Patent No.: US 8,737,282 B2
(45) Date of Patent: May 27, 2014

(54) DISCARD ACTION FOR MULTI-BROADCAST MULTICAST SERVICE DATA IN A MEDIUM ACCESS CONTROL LAYER

(75) Inventors: Li-Chih Tseng, Taipei (TW); Yu-Hsuan Guo, Taipei (TW)

(73) Assignee: Innovative Sonic Corporation, Taipei (TW)

( * ) Notice: Subject to any disclaimer, the term of this patent is extended or adjusted under 35 U.S.C. 154(b) by 308 days.

(21) Appl. No.: 13/007,216

(22) Filed: Jan. 14, 2011

(65) Prior Publication Data

US 2011/0176471 A1 Jul. 21, 2011

Related U.S. Application Data

(60) Provisional application No. 61/296,011, filed on Jan. 18, 2010.

(51) Int. Cl.
*H04H 20/71* (2008.01)

(52) U.S. Cl.
USPC .......................................................... 370/312

(58) Field of Classification Search
CPC .................................. H04W 4/06; H04W 8/26
USPC .......................................................... 370/312
See application file for complete search history.

(56) References Cited

U.S. PATENT DOCUMENTS

2011/0274025 A1* 11/2011 Hsu ................................ 370/312

OTHER PUBLICATIONS

3GPP Organizational partners, 3GPP TS 36.321, "3rd Generation Partnership Project; Technical Specification Group Radio Access Network; Evolved Universal Terrestrial Radio Access (E-UTRA) Medium Access Control (MAC) protocol specification", v9.1.0, Dec. 2009, pp. 48.*

* cited by examiner

*Primary Examiner* — Andrew Chriss
*Assistant Examiner* — Peter Mak
(74) *Attorney, Agent, or Firm* — Blue Capital Law Firm, P.C.

(57) ABSTRACT

A method of handling by a UE a Dynamic Scheduling information (DSI) Medium Control Access MAC control element containing a Stop MTCH field having a reserved value includes ignoring the Stop MTCH field, treating the Stop MTCH field having the reserved value to mean that the corresponding MTCH is not scheduled, or receiving all Multimedia Broadcast multicast service Single Frequency Network (MBSFN) subframes corresponding to the DSI MAC control element during a scheduling period associated with the DSI MAC control element until the MTCH is completely received.

8 Claims, 7 Drawing Sheets

6.1.3.7 MBMS Dynamic Scheduling Information MAC Control Element

The MBMS Dynamic Scheduling Information MAC Control Element illustrated in Figure 6.1.3.7-1 is identified by a MAC PDU subheader with LCID as specified in Table 6.2.1-4. This control element has a variable size equal to 2 x (the number of elements in the *MBMS-SessionInfoList* sequence) bytes. For each MTCH the fields below are included:

- LCID: this field indicates the Logical Channel ID of the MTCH. The length of the field is 5 bits;
- Stop MTCH: this field indicates the ordinal number of the subframe within the MSAP occasion where the corresponding MTCH stops. The length of the field is 11 bits. The special Stop MTCH value 2047 indicates that the corresponding MTCH is not scheduled. The value range 2043 to 2046 is reserved.

(Option 1) The UE shall ignore a Stop MTCH field containing a reserved value and its corresponding LCID field.

(Option 2) The reserved values of the Stop MTCH field if received by the current release version UEs shall be taken as 2047.

| | | |
|---|---|---|
| LCID 1 | Stop MTCH 1 | Oct 1 |
| Stop MTCH 1 | | Oct 2 |
| LCID 2 | Stop MTCH 2 | Oct 3 |
| Stop MTCH 2 | | Oct 4 |
| ... | | |
| LCID n | Stop MTCH n | Oct 2n-1 |
| Stop MTCH n | | Oct 2n |

Figure 6.1.3.7-1 Dynamic Scheduling Information MAC control element

FIG. 10

DISCARD ACTION FOR MULTI-BROADCAST MULTICAST SERVICE DATA IN A MEDIUM ACCESS CONTROL LAYER

CROSS-REFERENCE TO RELATED APPLICATIONS

The present application claims the benefit of U.S. Provisional Patent Application Ser. No. 61/296,011, filed on Jan. 18, 2010, entitled "Discard Action for MBMS data in MAC Layer," the entire disclosure of which is incorporated herein by reference.

FIELD

This disclosure generally relates to wireless communication networks, and more particularly, to a method and apparatus for Discard Action for Multi-Broadcast Multicast Service (MBMS) data in a Medium Access Control (MAC) Layer.

BACKGROUND

With the rapid rise in demand for communication of large amounts of data to and from mobile communication devices, traditional mobile voice communication networks have and are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

According to aspects of the disclosure, a method of handling by a User Equipment (UE) a Dynamic Scheduling information (DSI) Medium Control Access (MAC) control element containing a Stop Multicast Traffic Channel (MTCH) field containing a reserved Stop MTCH value includes receiving by the UE a DSI MAC control element including a Stop MTCH field containing a reserved value, and ignoring the Stop MTCH field.

According to aspects of the disclosure a method of handling by a User Equipment (UE) a Dynamic Scheduling information (DSI) Medium Control Access (MAC) control element containing a Stop Multicast Traffic Channel (MTCH) field containing a reserved Stop MTCH value includes receiving by the UE a DSI MAC control element including a Stop MTCH field containing a reserved value, and treating the reserved value of the Stop MTCH field to mean that the corresponding MTCH is not scheduled.

According to aspects of the disclosure, a method of handling by a User Equipment (UE) a Dynamic Scheduling information (DSI) Medium Control Access (MAC) control element containing a Stop Multicast Traffic Channel (MTCH) field containing a reserved Stop MTCH value includes receiving by the UE a DSI MAC control element including a Stop MTCH field containing a reserved value, and receiving all Multimedia Broadcast multicast service Single Frequency Network (MBSFN) subframes corresponding to the DSI MAC control element during a scheduling period associated with the DSI MAC control element until the MTCH is completely received.

According to aspects of the disclosure, a communication device configured to receive a Multicast Channel (MCH) transmission and handle a Dynamic Scheduling information (DSI) Medium Control Access (MAC) control element containing a Stop Multicast Traffic Channel (MTCH) field having a reserved value includes a first module and a second module. The first module is configured to receive a DSI MAC control element including a Stop MTCH field having a reserved value. The second module includes a processor configured to execute a program to perform a procedure selected from the group consisting of ignore the Stop MTCH field, treat the reserved value of the Stop MTCH field to mean that the corresponding MTCH is not scheduled, and receive all Multimedia Broadcast multicast service Single Frequency Network (MBSFN) subframes corresponding to the DSI MAC control element during a scheduling period associated with the DSI MAC control element until the MTCH is completely received

BRIEF DESCRIPTION OF THE DRAWINGS

FIG. 10 shows a proposal for revising 3GPP standard as described in document 3GPP TS 36.321 based on the exemplary embodiments of FIGS. 7 and 8.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP2 UMB (Ultra Mobile Broadband), WiMax, or some other modulation techniques.

In particular, The exemplary wireless communication systems devices described below may be designed to support one or more standards such as the standard offered by a consortium named "3rd Generation Partnership Project" referred to herein as 3GPP, including Document Nos. 3GPP TS 36.300 ("Evolved Universal Terrestrial Radio Access (E-UTRA) and Evolved Universal Terrestrial Radio Access Network (E-UTRAN); Overall description; Stage 2; (Release 9)"), 3GPP TS 36.321 ("Evolved Universal Terrestrial Radio Access (E-UTRA); Medium Access Control (MAC) protocol specification (Release 9)"), 3GPP TS 36.331 ("Evolved Universal Terrestrial Radio Access (E-UTRA); Radio Resource Control (RRC); Protocol specification (Release 9)"), and 3GPP TSG-RAN WG2 R2-100101 ("CR to 36.321 on error handling for MBMS"). The standards and documents listed above are hereby expressly incorporated herein.

Figure 1:
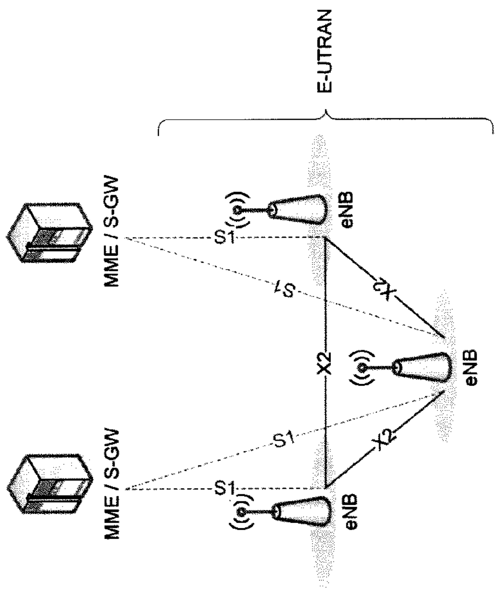
FIG. 1 shows a diagram of a wireless communication system according to one exemplary embodiment.

An exemplary network structure of an Evolved Universal Terrestrial Radio Access Network (E-UTRAN) 100 as a mobile communication system is shown in FIG. 1 according to one exemplary embodiment. The E-UTRAN system can also be referred to as a LTE (Long-Term Evolution) system. The E-UTRAN generally includes eNode B or eNB 102, which function similar to a base station in a mobile voice communication network. Each eNB is connected by X2 interfaces. The eNBs are connected to terminals or user equipment (UE) 104 through a radio interface, and are connected to Mobility Management Entities (MME) or Serving Gateway (S-GW) 106 through Si interfaces.

Figure 2:
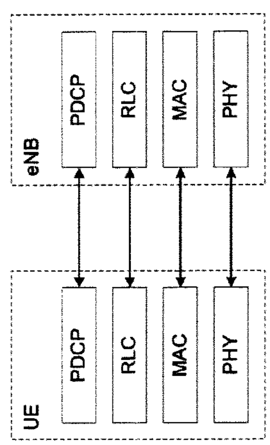
FIG. 2 shows a user plane protocol stack of the wireless communication system of FIG. 1 according to one exemplary embodiment.
Figure 3:
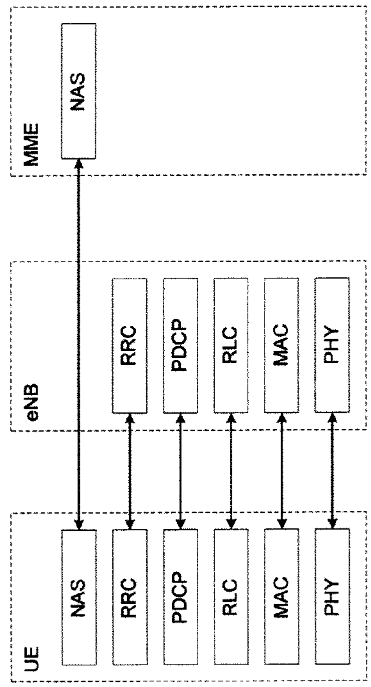
FIG. 3 shows a control plane protocol stack of the wireless communication system of FIG. 1 according to one exemplary embodiment.

Referring to FIGS. 2 and 3, the LTE system is divided into control plane 108 protocol stack (shown in FIG. 3) and user plane 110 protocol stack (shown in FIG. 2) according to one exemplary embodiment. The control plane performs a function of exchanging a control signal between a UE and an eNB and the user plane performs a function of transmitting user data between the UE and the eNB. Referring to FIGS. 2 and 3, both the control plane and the user plane include a Packet Data Convergence Protocol (PDCP) layer, a Radio Link Control (RLC) layer, a Medium Access Control (MAC) layer and a physical (PHY) layer. The control plane additionally includes a Radio Resource Control (RRC) layer. The control plane also includes a Network Access Stratum (NAS) layer, which performs among other things including Evolved Packet System (EPS) bearer management, authentication, and security control.

The PHY layer provides information transmission service using a radio transmission technology and corresponds to a first layer of an open system interconnection (OSI) layer. The PHY layer is connected to the MAC layer through a transport channel. Data exchange between the MAC layer and the PHY layer is performed through the transport channel. The transport channel is defined by a scheme through which specific data are processed in the PHY layer.

The MAC layer performs the function of sending data transmitted from a RLC layer through a logical channel to the PHY layer through a proper transport channel and further performs the function of sending data transmitted from the PHY layer through a transport channel to the RLC layer through a proper logical channel. Further, the MAC layer inserts additional information into data received through the logical channel, analyzes the inserted additional information from data received through the transport channel to perform a proper operation and controls a random access operation.

The MAC layer and the RLC layer are connected to each other through a logical channel. The RLC layer controls the setting and release of a logical channel and may operate in one of an acknowledged mode (AM) operation mode, an unacknowledged mode (UM) operation mode and a transparent mode (TM) operation mode. Generally, the RLC layer divides Service Data Unit (SDU) sent from an upper layer at a proper size and vice versa. Further, the RLC layer takes charge of an error correction function through an automatic retransmission request (ARQ).

The PDCP layer is disposed above the RLC layer and performs a header compression function of data transmitted in an IP packet form and a function of transmitting data without loss even when a Radio Network Controller (RNC) providing a service changes due to the movement of a UE.

The RRC layer is only defined in the control plane. The RRC layer controls logical channels, transport channels and physical channels in relation to establishment, re-configuration and release of Radio Bearers (RBs). Here, the RB signifies a service provided by the second layer of an OSI layer for data transmissions between the terminal and the E-UTRAN. If an RRC connection is established between the RRC layer of a UE and the RRC layer of the radio network, the UE is in the RRC connected mode. Otherwise, the UE is in an RRC idle mode.

Downlink transport channels for transmitting data from a network to a UE may comprise a Broadcast Channel (BCH) for transmitting system information, a Paging Channel (PCH) for transmitting paging messages and a downlink Shared Channel (DL-SCH) for transmitting other user traffic or control messages. Traffic or control messages of a downlink point-to-multipoint service (multicast or broadcast service) may be transmitted either via a DL-SCH, or via a separate downlink Multicast Channel (MCH). In addition, uplink transport channels for transmitting data from a terminal to a network may comprise a Random Access Channel (RACH) for transmitting an initial control message and an uplink Shared Channel (UL-SCH) for transmitting user traffic or control messages.

Logical channels which are located at an upper portion of transport channels and mapped to the transport channels include a Broadcast Control Channel (BCCH), a Paging Control Channel (PCCH), a Common Control Channel (CCCH), a Dedicated Control Channel (DCCH), a Dedicated Traffic Channel (DTCH), a MBMS point-to-multipoint Control Channel/Multicast Control Channel (MCCH), a MBMS point-to-multipoint Traffic Channel/Multicast Traffic Channel (MTCH), and the like.

The MTCH is a logical channel transmitting data of a specific MBMS service. Accordingly, the MTCH may be constructed by the number of MBMS services provided in a cell. However, a UE recognizes and receives only a MTCH relating to an MBMS service received by the UE. The MCCH is a logical channel through which a control message relating to an MBMS service is transmitted. The MAC layer can process a MTCH and a MCCH. Both data from MTCH and data from MCCH are transmitted through MCH.

Figure 4:
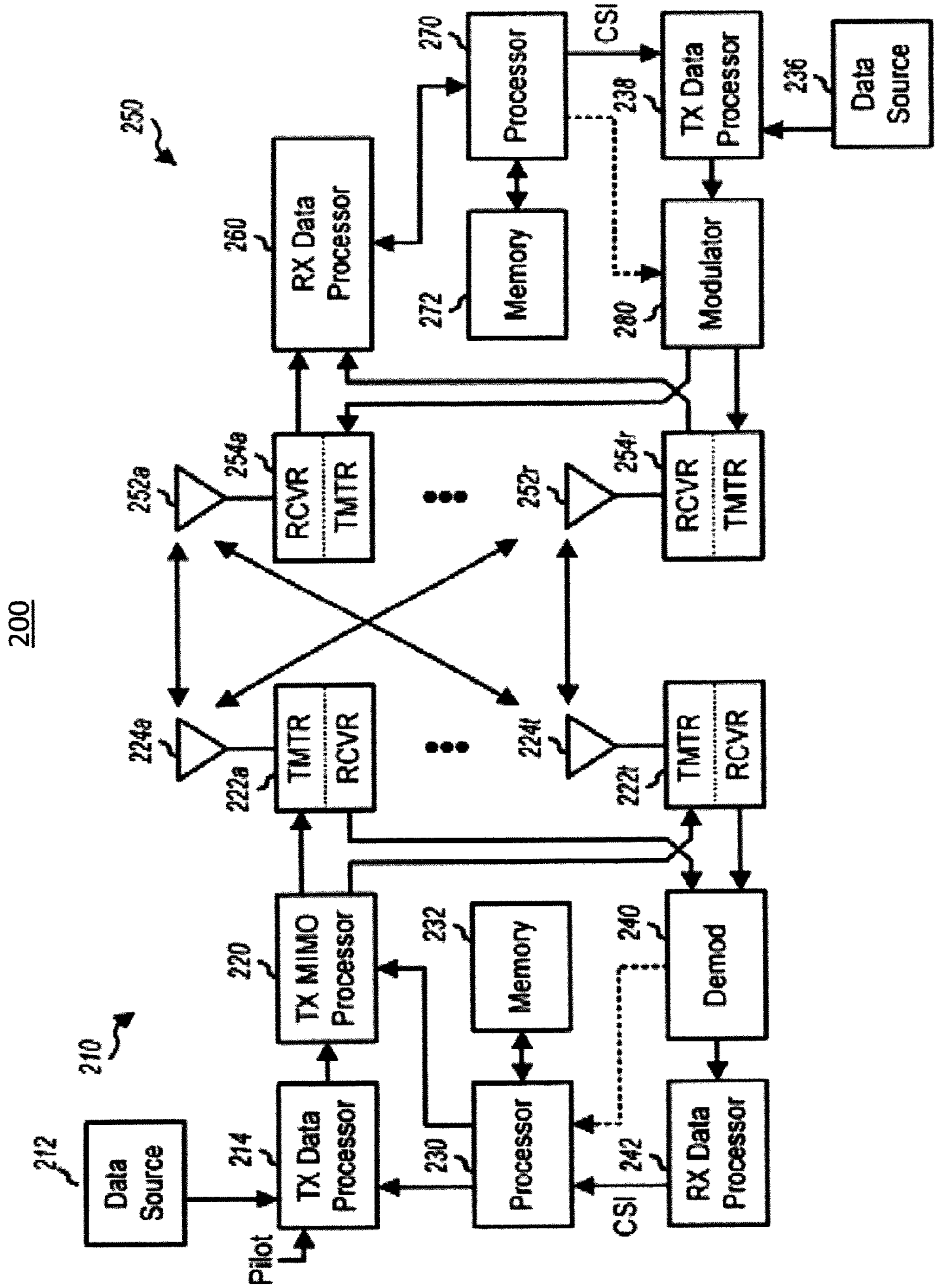
FIG. 4 is a block diagram of a transmitter system (also known as access network) and a receiver system (also known as UE) according to one exemplary embodiment.

FIG. 4 is a simplified block diagram of an exemplary embodiment of a transmitter system 210 (also known as the access network) and a receiver system 250 (also known as access terminal or UE in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beam forming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 5:
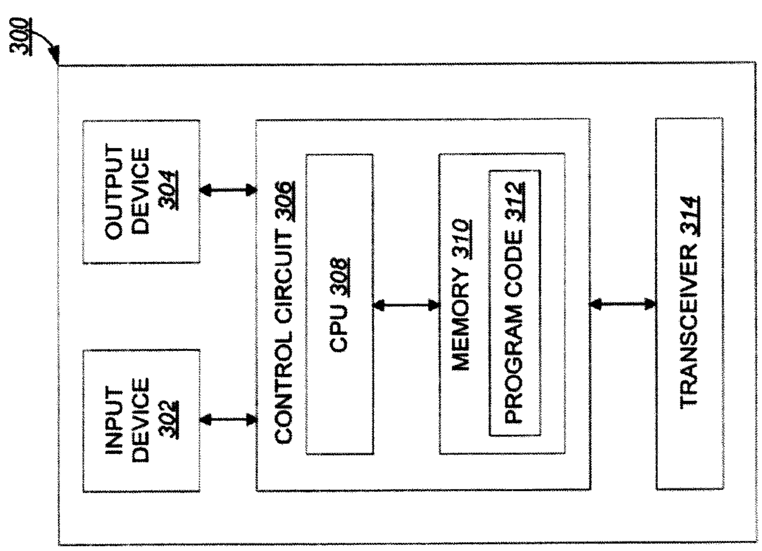
FIG. 5 is a functional block diagram of a UE according to one exemplary embodiment.

Turning to FIG. 5, this figure shows an alternative simplified functional block diagram of a communication device according to one exemplary embodiment. The communication device 300 in a wireless communication system can be utilized for realizing the UE 104 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The program code 312 includes the application layers and the layers of the control plane 108 and layers of user plane 110 as discussed above except the PHY layer. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

In 3GPP TS 36.321 V9.1.0 specifies the following in section 5.12:

5.12 MCH Reception

MCH transmission may occur in subframes configured by upper layer for MCCH or MTCH transmission. For each such subframe, upper layer indicates if signalling MCS or data MCS applies. The transmission of an MCH occurs in a set of subframes known as the MSAP occasion, defined by PMCH-Config. A Dynamic Scheduling Information MAC control element is included in the first subframe of each MSAP occasion to indicate the position of each MTCH in the MSAP occasion and unused subframes. The UE shall assume that the first scheduled MTCH starts immediately after the Dynamic Scheduling Information MAC control element or the MCCH, and the other scheduled MTCH(s) start at the earliest in the subframe where the previous MTCH stops. When the UE needs to receive MCH, the UE shall;

attempt to decode the TB on the MCH;

if a TB on the MCH has been successfully decoded:

demultiplex the MAC PDU and deliver the MAC SDU (s) to upper layers.

In the above, MCS, MSAP, TB and PDU are abbreviations for Modulation and Coding Scheme, MCH Subframe Allocation Pattern, Transport Block and Protocol Data Unit, respectively.

Figure 6:
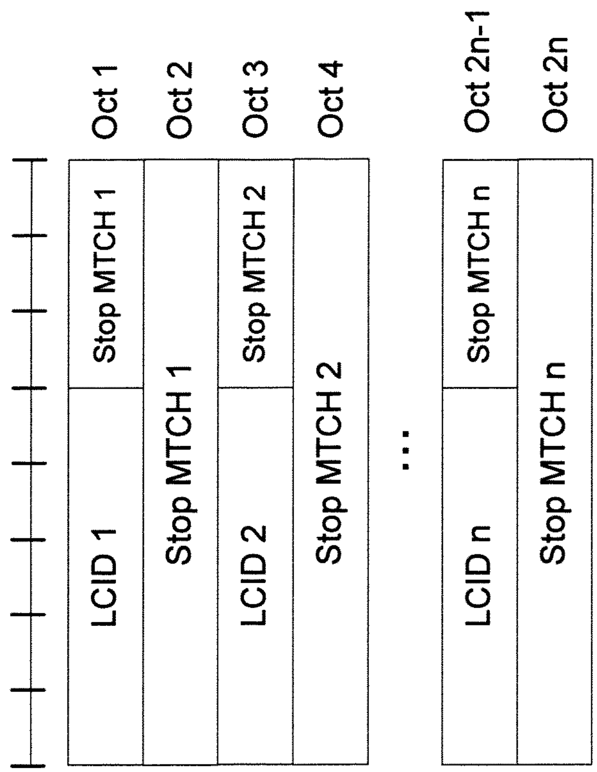
FIG. 6 is a table showing MCH Scheduling Information MAC control element according to one exemplary embodiment.

A problem that may occur concerns the handling of Stop MTCH values in a Dynamic Scheduling Information (DSI) MAC control element. A DSI MAC control element is carried by a MAC PDU transmitted through MCH. Referring to FIG. 6, the DSI MAC Control Element is identified by a MAC PDU subheader with Logical Channel ID (LCID). For each MTCH, the LCID field and a Stop MTCH field are included. The LCID field indicates the Logical Channel ID of the MTCH. The Stop MTCH field indicates the ordinal number of the subframe within the MCH scheduling period where the corresponding MTCH stops. The special Stop MTCH value 2047 indicates that the corresponding MTCH is not scheduled. The value range 2043 to 2046 is reserved.

Current LTE network standard (section 5.11 of 3GPP TS 36.321) specifies that when a MAC entity receives a MAC PDU for the UE's Cell Radio Network Temporary Identifier (C-RNTI) or Semi-Persistent Scheduling C-RNTI, or by the configured downlink assignment, containing reserved or invalid values, the MAC entity shall discard the received PDU.

Current LTE network standard does not specify handling of a DSI MAC control element containing reserved Stop MTCH values because the DSI MAC control element is carried by a MAC PDU for the UE's MBMS Radio Network Temporary Identifier (M-RNTI). A UE may receive this kind of DSI MAC control element in a future LTE network that utilizes the reserved Stop MTCH values for some specific purposes. Because it is not specified for the legacy UE how to interpret a DSI MAC control element containing reserved Stop MTCH values, the legacy UE may malfunction or discard the whole MAC PDU carrying the DSI MAC control element based on the specified general handling. If the DSI MAC control element is discarded, because the UE does not have any MTCH scheduling information within a corresponding MCH scheduling period, the UE may try to receive all the MBSFN subframes or may not receive any MBSFN subframe within the MCH scheduling period. Then, additional power is consumed or some data of the MBMS service is lost.

Figure 7:
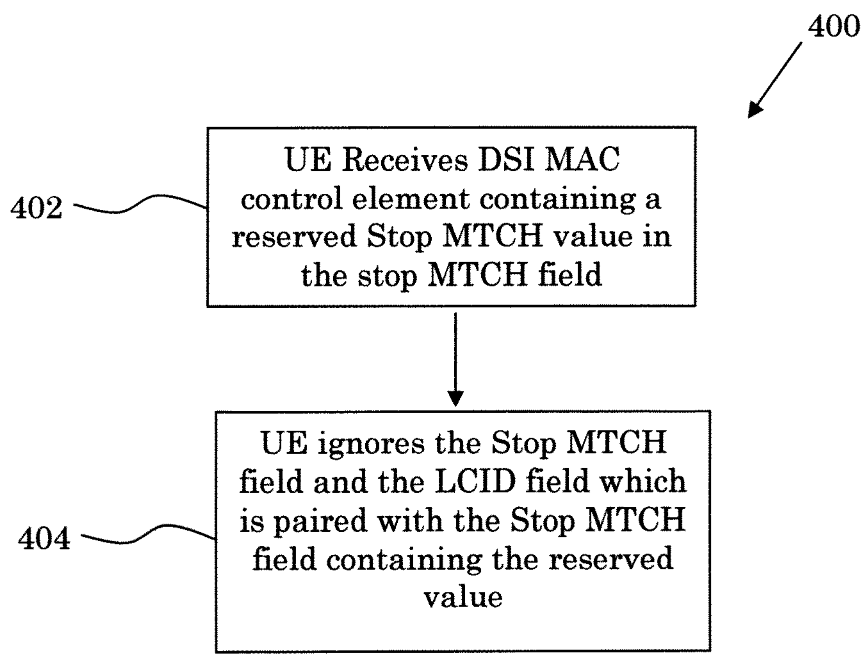
FIG. 7 is a flow chart illustrating a method of handling a DSI MAC control element containing a reserved Stop MTCH value according to one exemplary embodiment.

FIG. 7 shows a first exemplary embodiment of a method 400 of handling a DSI MAC control element containing a reserved Stop MTCH value. Referring also to FIG. 6, the method includes at step 402 a UE receiving a DSI MAC control element, which includes a reserved Stop MTCH value. At step 404, the UE ignores the Stop MTCH field of the DSI MAC control element which contains the reserved value and the LCID field which is paired with the Stop MTCH field containing the reserved value. This means that the remaining fields which are not ignored are kept and interpreted normally. And the corresponding UE behaviors would be performed, i.e. if the remaining fields includes the scheduling information for the MTCH the UE wants to receive, the UE would receive the corresponding subframes based on the scheduling information.

Figure 8:
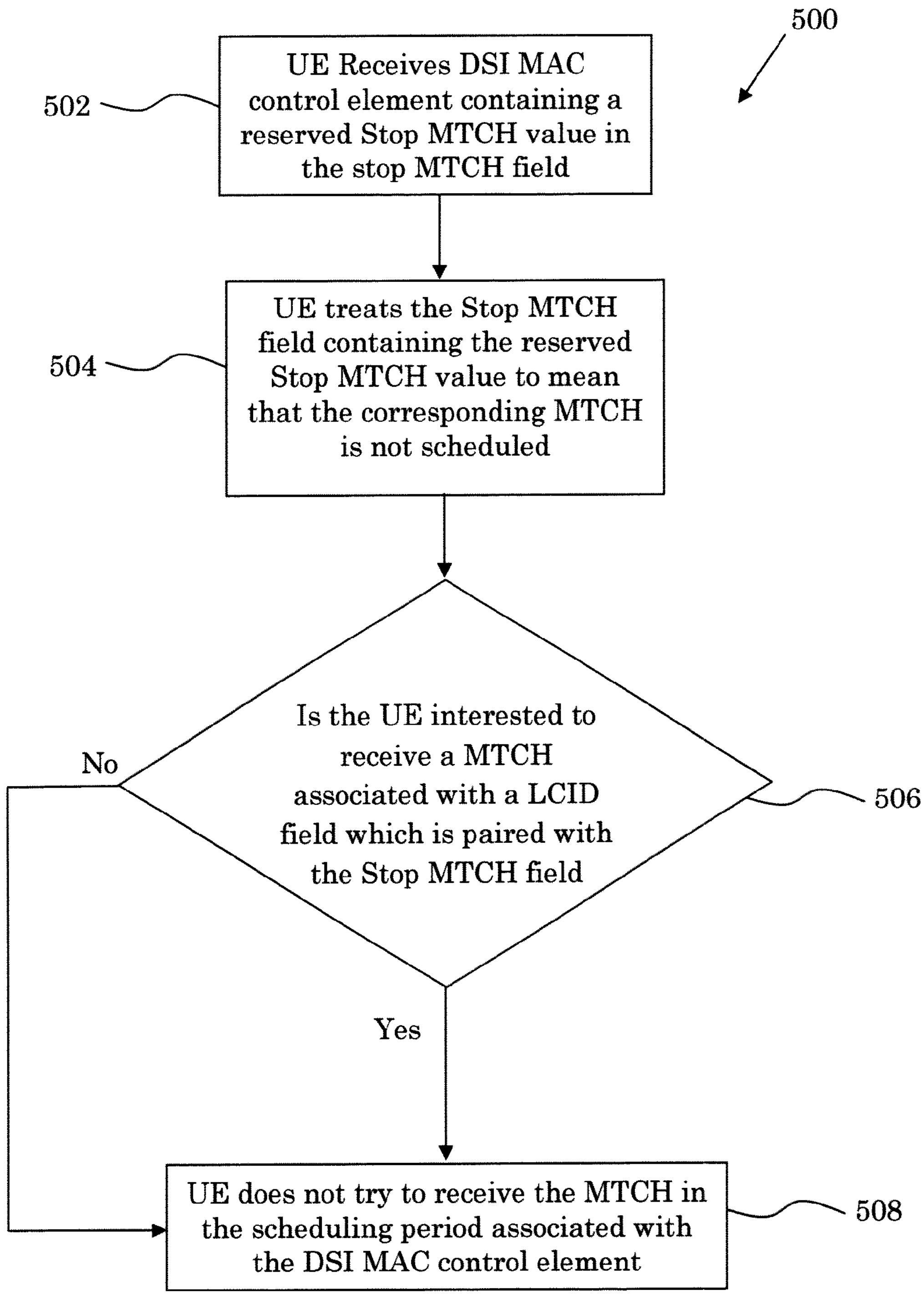
FIG. 8 is a flow chart illustrating a method of handling a DSI MAC control element containing a reserved Stop MTCH value according to one exemplary embodiment.

FIG. 8 shows a second embodiment of a method 500 of handling a DSI MAC control element containing a reserved Stop MTCH value. Referring also to FIG. 6, the method includes at step 502 a UE receiving a DSI MAC control element, which includes a reserved Stop MTCH value. At step 504, the UE treats the value of the Stop MTCH field containing the reserved Stop MTCH value as 2047, which means the corresponding MTCH is not scheduled. This means whether or not the UE is interested to receive a MTCH associated with a LCID field which is paired with the Stop MTCH field containing the reserved value (shown at step 506), the UE does not try to receive the MTCH in the scheduling period associated with the DSI MAC control element (shown in step 508).

Figure 9:
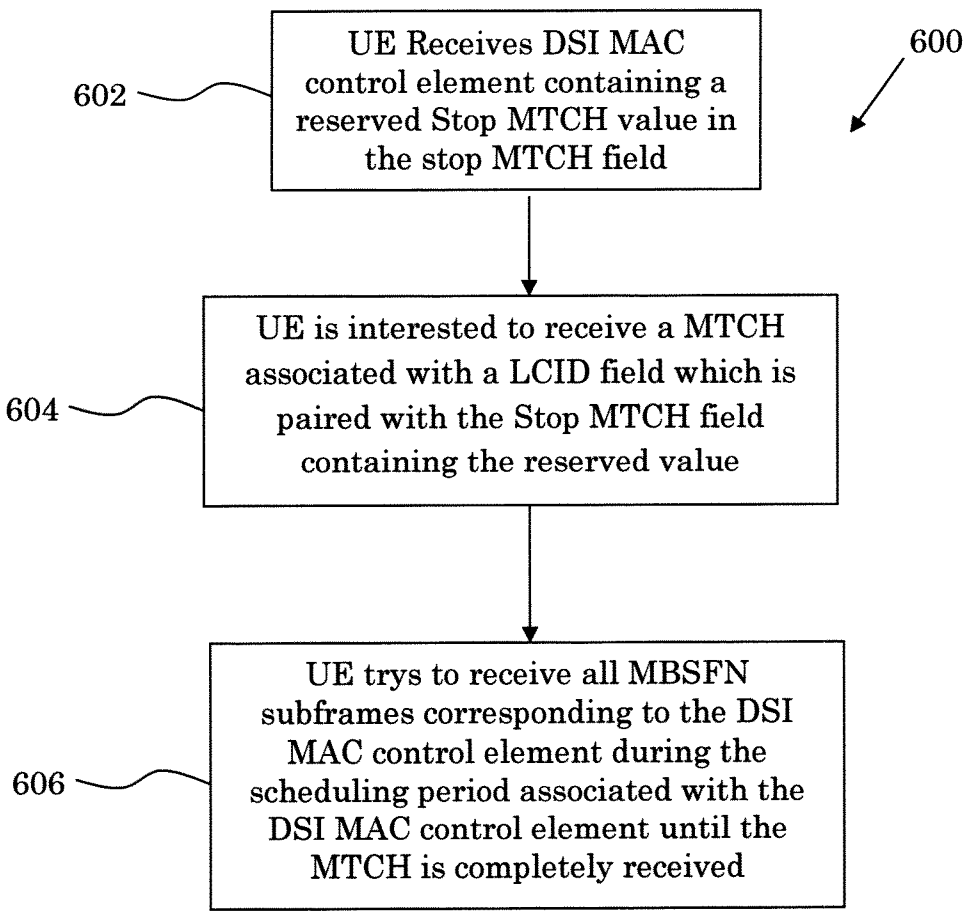
FIG. 9 is a flow chart illustrating a method of handling a DSI MAC control element containing a reserved Stop MTCH value according to one exemplary embodiment.

FIG. 9 shows a third embodiment of a method 600 of handling a DSI MAC control element containing a reserved Stop MTCH value. Referring also to FIG. 6, the method includes at step 602 a UE receiving a DSI MAC control element, which includes a reserved Stop MTCH value. At step 604, the UE is interested to receive a MTCH associated with a LCID field which is paired with the Stop MTCH field containing the reserved Stop MTCH value. At step 606, the UE trys to receive all MBSFN subframes corresponding to the DSI MAC control element during a scheduling period associate with the DSI MAC control element until the MTCH is completely received.

According to the above discussed embodiments, the UE does not discard the whole MAC PDU or DSI MAC control element when the DSI MAC control element contains a reserved Stop MTCH value. If handling of a DSI MAC control element containing reserved Stop MTCH values is missed, a UE may malfunction if this kind of DSI MAC control element is received. If the UE discards the whole MAC PDU or DSI MAC control element, MBMS data is missing (if UE decides to not receive any MBSFN subframe corresponds to this DSI) or the power is consumed (if UE decides to receive all MBSFN subframe corresponds to this DSI).

Based on the above embodiments section 6.1.3.7 of 3GPP TS ("Evolved Universal Terrestrial Radio Access (E-UTRA); Medium Access Control (MAC) protocol specification (Release 9)") can be revised to the form shown in FIG. 10.

When a UE is not interested to receive a MTCH associated to a LCID field which is paired with a Stop MTCH field having a reserved value, selecting the first embodiment can prevent UE malfunction, reduce power consumption, or prevent MBMS data missing. When a UE is interested to receive a MTCH associated to LCID field which is paired with a Stop MTCH field having a reserved value, selecting the second embodiment can prevent UE malfunction or reduce power consumption. Selecting the third embodiment can prevent UE malfunction or MBMS data missing.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of handling by a User Equipment (UE) a Dynamic Scheduling information (DSI) Medium Control Access (MAC) control element containing a Stop Multicast Traffic Channel (MTCH) field containing a reserved Stop MTCH value, the method comprising:

receiving, by the UE, a first DSI MAC control element including a first Stop MTCH field that does not contain a reserved value;

attempting to decode a Transport Block (TB) on a Multicast Channel (MCH) according to the first Stop MTCH field;

receiving, by the UE, a second DSI MAC control element including a second Stop MTCH field containing a reserved value; and ignoring the second Stop MTCH field.

2. The method of claim 1, further comprising ignoring, by the UE, a corresponding Logical Channel ID (LCID) field paired with the second Stop MTCH field containing the reserved value.

3. The method of claim 1, wherein the reserved value is one of 2043 to 2046.

4. The method of claim 1, wherein the UE does not ignore other Stop MTCH fields not containing the reserved value and their paired LCID fields in the second DSI MAC control element.

5. A communication device configured to receive a Multicast Channel (MCH) transmission and handle a Dynamic Scheduling information (DSI) Medium Control Access (MAC) control element containing a Stop Multicast Traffic Channel (MTCH) field having a reserved value, the device comprising:

a first module configured to receive a first DST MAC control element including a first Stop MTCH field that does not contain a reserved value, and to attempt to decode a Transport Block (TB) on a Multicast Channel (MCH) according to the first Stop MTCH field; and a second module configured to receive a second DSI MAC control element including a second Stop MTCH field containing the reserved value, and to ignore the second Stop MTCH field.

6. The communication device of claim 5, wherein the second module is configured to further ignore a corresponding Logical Channel ID (LCID) field paired with the second Stop MTCH field containing the reserved value when the UE ignores the second Stop MTCH field.

7. The communication device of claim 5, wherein the reserved value is one of 2043 to 2046.

8. The communication device of claim 5, wherein when the second module ignores the second Stop MTCH field, the second module does not ignore other Stop MTCH fields not containing the reserved value and their paired LCID fields in the second DSI MAC control element.

* * * * *